May 4, 1926.

P. IVANOFF

COMOTIONAL POWER TRANSMISSION

Filed Jan. 25, 1924     2 Sheets-Sheet 1

1,583,719

INVENTOR
*Peter Ivanoff*
BY
*Geo. P. Kimmel*  ATTORNEY

May 4, 1926.                                                               1,583,719
P. IVANOFF
COMOTIONAL POWER TRANSMISSION
Filed Jan. 25, 1924                2 Sheets-Sheet 2

INVENTOR
*Peter Ivanoff*
BY
*Geo. F. Kimmel*   ATTORNEY

Patented May 4, 1926.

1,583,719

UNITED STATES PATENT OFFICE.

PETER IVANOFF, OF HAMILTON, MONTANA.

COMOTIONAL POWER TRANSMISSION.

Application filed January 25, 1924. Serial No. 688,510.

*To all whom it may concern:*

Be it known that I, PETER IVANOFF, a citizen of the United States, residing at Hamilton, in the county of Ravalli and State of Montana, have invented certain new and useful Improvements in Comotional Power Transmissions, of which the following is a specification.

This invention relates to co-motional power transmissions wherein a planetary gear system working on the leverage principle is used to transmit power.

With this and other objects in view, the invention consists in certain novel features of construction as hereinafter shown and described and then specifically pointed out in the claim, and in the drawings illustrative of the preferred embodiment of the invention.

Figure 2:
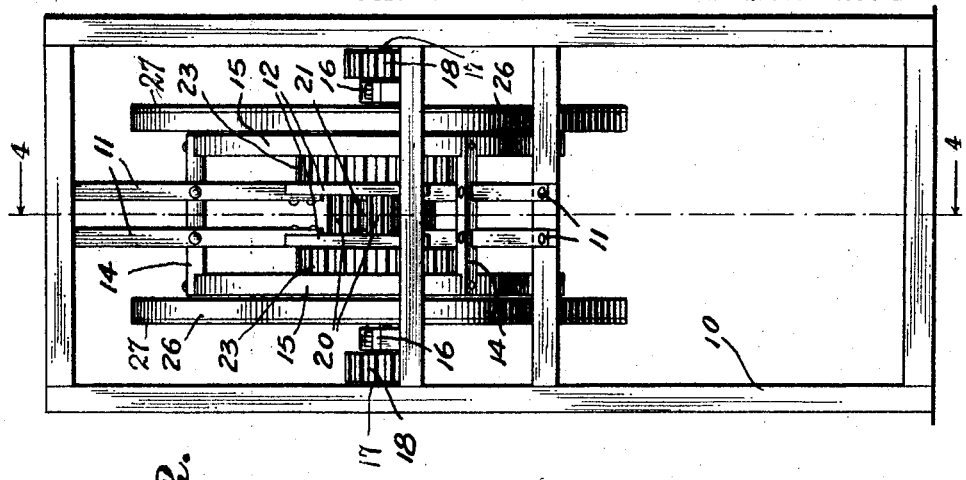
Fig. 2 is a front elevation.
Figure 1:
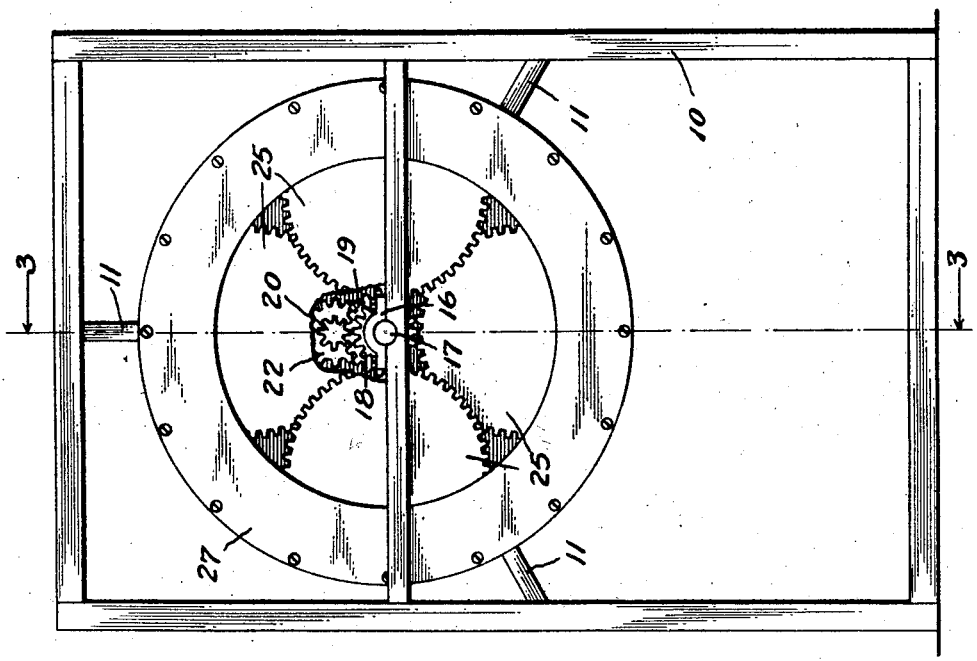
Figure 1 is a side elevation.
Figure 4:
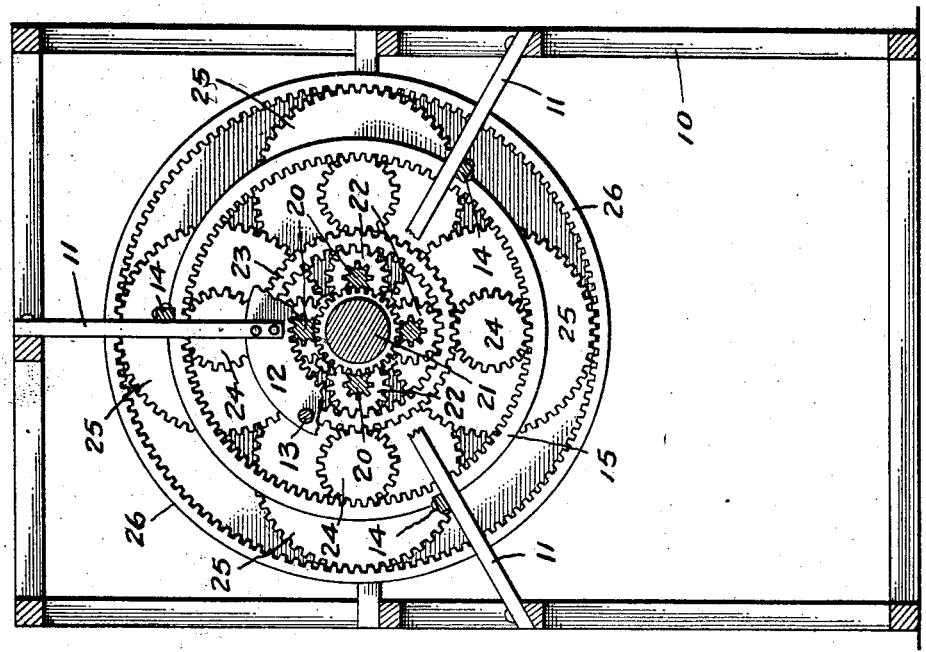
Fig. 4 is a vertical section taken on the line 4, 4 of Fig. 2.

Referring to the drawings, the improved apparatus is mounted in a suitable frame designated as a whole by the numeral 10. Secured to said frame are radial braces 11 to which are rigidly fixed a pair of inner internal gears 12 held in spaced apart relation by spacer bolts 13. Cross braces 14 are secured to the braces 11 and are used to fixedly support an outer pair of intermediate ring gears 15 which are internally threaded.

Figure 3:
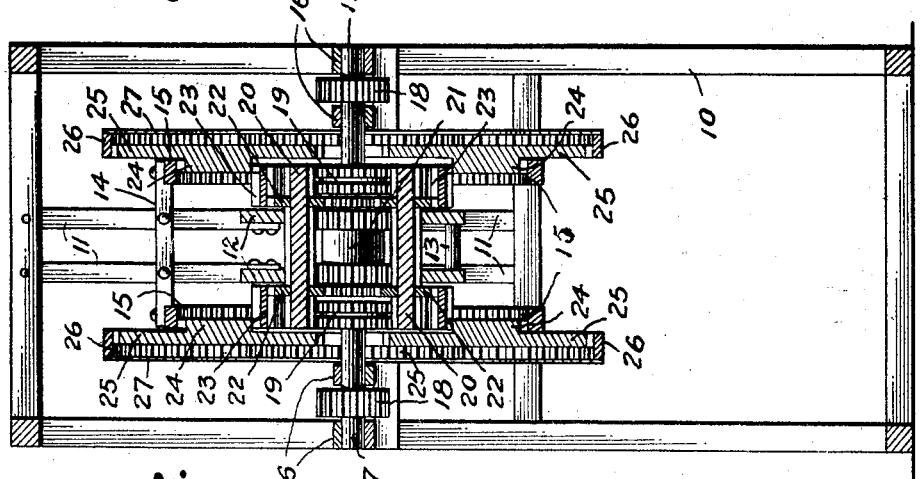
Fig. 3 is a vertical section taken on the line 3, 3 of Fig. 1.

Supported in axial alinement for rotation by bearings 16 on certain of the members of the frame 10 are a pair of stub shafts 17. Pinions 18 are fixedly mounted on said shafts by means of which power is applied to the device. Gears 19 are rigidly secured to each of the inner ends of said shafts as shown in Fig. 3.

Toothed stub shafts 20, in mesh with the gears 19, extend across and form connecting means between the two portions of the gear system, the two portions being identical. Any required number of the toothed stub shafts may be employed but four are shown for illustration. The toothed stub shafts 20 are also in mesh with the fixed inner internal gears 12 which serve as the first fulcrum in the leverage system. A short idler gear 21 is located between the gears 19 and is in mesh with the toothed stub shafts 20, and serves to retain the latter in place and to prevent lateral play.

Pinions 22 are fixed to the end portions of each of the toothed stub shafts 20 and are in mesh with the inner teeth of a pair of inner intermediate ring gears 23 which are provided with both internal and external teeth. The external teeth of said ring gears are in mesh with small gears 24 concentrically fixed to large gears 25 and thus rotate therewith. Four of the gears 24 are shown on either side but the number may be varied as desired. The small gears 24 are also in mesh with the stationary intermediate internal gears 15 which thus serves as the second fulcrum in the leverage system.

The gears 25 mesh with a pair of outer ring gears 26 which are formed with internal teeth. Annular supports 27 are attached to the outer faces of the ring gears 26 and preferably supported by roller bearings to prevent lateral play of the gear system.

With the exception of the frame 10, braces 11 and 14 which support the fixed gears 12 and 15 and the stub shafts 17, the entire gear system is floating. The apparatus is so designed that the large outer ring gears 26 from which the power is taken, will travel at less speed than the speed of the pinions 18 to which the power is applied.

The preferred embodiment of the invention is disclosed in the drawings and set forth in the specification, but it will be understood that modifications within the scope of the claim may be made in the construction without departing from the principle of the invention or sacrificing any of its advantages.

Having thus described the invention, what is claimed as new is:—

A co-motional power transmitting device comprising a supporting frame, spaced co-acting stub shafts supported by said frame in longitudinal alignment and each provided with a driving pinion therefor, gears on the inner ends of said shafts, an idler gear interposed between the gears on the inner ends of said shafts to prevent lateral play thereof, a plurality of spaced toothed shafts supported by said idler gear meshing therewith and with the gears on said stub shafts, a pair of spaced stationary inner ring gears supported from said frame and meshing with said toothed shafts, a pair of spaced stationary outer intermediate ring gears supported from said frame and having internal teeth, pinions carried by said toothed shafts, a pair of spaced internally and externally toothed inner intermediate ring gears meshing with the pinions on said toothed shafts, a spaced pair of outer ring gears, two sets of large gears meshing with said outer ring gears, and small gears carried by said large gears and meshing with said outer intermediate and the said inner intermediate ring gears.

In testimony whereof, I affix my signature hereto.

PETER IVANOFF.